United States Patent [19]

Eastwood, II

[11] 3,717,380
[45] Feb. 20, 1973

[54] TRACTION DEVICE FOR VEHICLES

[76] Inventor: Ralph W. Eastwood, II, 125 Woodlane Dr., Toccoa, Ga. 30577

[22] Filed: Feb. 12, 1971

[21] Appl. No.: 114,755

[52] U.S. Cl.......................301/41 R, 29/159, 29/558
[51] Int. Cl. ............................................ B60b 15/00
[58] Field of Search .......................301/5 R, 41 R, 43

[56] References Cited

UNITED STATES PATENTS

| | | | |
|---|---|---|---|
| 740,035 | 9/1903 | Nichols | 301/41 R |
| 354,702 | 12/1886 | Huber | 301/43 |
| 1,779,994 | 10/1930 | Tatter | 301/41 |

FOREIGN PATENTS OR APPLICATIONS

| | | | |
|---|---|---|---|
| 9,655 | 1927 | Australia | 301/41 |
| 595,521 | 7/1925 | France | 180/6 R |

*Primary Examiner*—Richard J. Johnson
*Attorney*—Birch & Birch

[57] ABSTRACT

A wheel configuration is provided which is capable of effecting pure walking, pure rolling or pure paddling motions or a composite thereof depending upon the environmental of the surface upon which the configuration is operating. In one embodiment of the invention the wheel configuration is that generated by cutting on a line parallel to its rolling axis, a rotating cube having its rolling axis coincident with a diagonal of the cube. At selected depths of cut, a serpentine rolling periphery is generated which will provide a pure rolling motion on a hard flat surface while the wheel configuration maintains its other motion capabilities.

8 Claims, 8 Drawing Figures

INVENTOR
RALPH W. EASTWOOD II

BY Birch & Birch
ATTORNEY

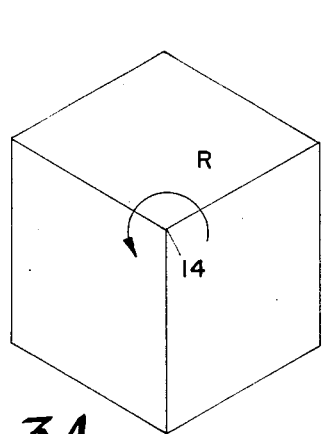
Fig. 3A
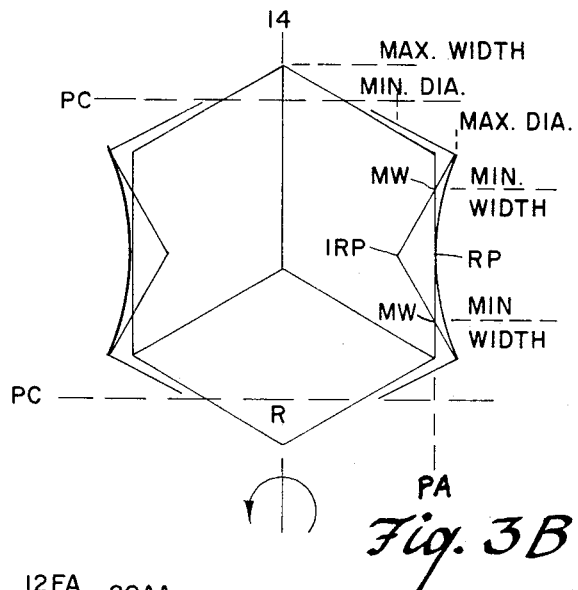
Fig. 3B
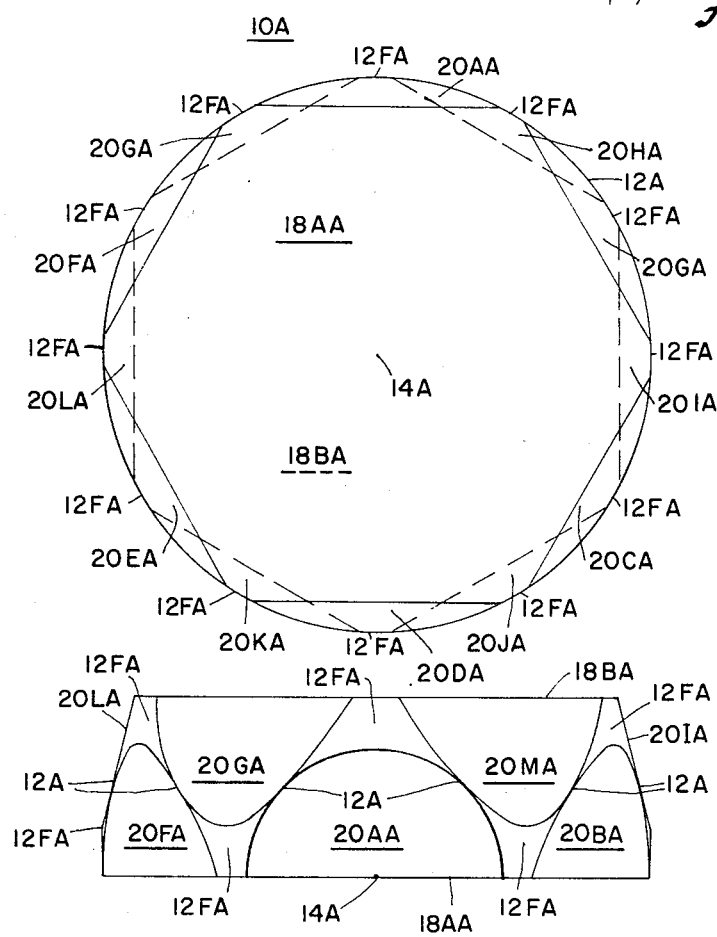
Fig. 4
Fig. 5

INVENTOR
RALPH W. EASTWOOD II

3,717,380

TRACTION DEVICE FOR VEHICLES

This invention relates to traction devices for vehicles and more particularly to a hybrid rotary wheel means and a basic configuration for same which has substantially universal propulsion capabilities on both land and water surfaces and which is adaptable, by selective modification of the basic configuration thereof, to selectively enhance specific propulsion capabilities thereof.

A variety of traction devices have been developed in the prior art for increased vehicle traction on adverse surfaces and/or for amphibious vehicles. Square wheels, tandem wheels with non-circular peripheries, auger devices and the like have been developed.

None of these prior art devices have the flexibility of operation needed for optimized adaptability to smooth, hard, soft, rough, marshy and water surface propulsion of the same vehicle over the range of vehicle speeds compatible with such a wide variety of operating conditions.

Such an optimized traction device in the form of a hybrid wheel configuration has long been desired and needed for vehicles utilized in exploration, military operations, agriculture, construction, transportation, multi-purpose utility functions, recreation, toys and the like.

It is, therefore, an object of the present invention to provide a new and novel hybrid traction wheel means having optimized propulsion capabilities over a wide range of land and water surface conditions over a wide range of vehicle operating speeds attendant to such a range of conditions.

It is another object of the present invention to provide a new and novel hybrid traction-wheel means capable of optimized performance of rolling, walking, paddling and combinations of these actions.

Still another object of the present invention is to provide a new and novel hybrid traction-wheel means capable of optimized performance of rolling, walking, paddling and combinations of these actions which is readily adaptable to both solid wheel construction and pneumatic tire construction over a wide range of attendant variations of such construction.

Yet another object of the present invention is to provide a new and novel basic configuration for hybrid traction wheel means for vehicles, said configuration being readily adaptable to selectively enhance various desired traction and propulsion characteristics of said wheel means.

These and other objects of the present invention will become more fully apparent with reference to the following specification and drawings which relate to preferred embodiments of the present invention.

In the drawings:

FIGS. 3A and 3B illustrate a basic starting point for generation of the basic configuration of FIGS. 1 and 2;

FIG. 4 is a side elevation of a second embodiment of the present invention;

FIG. 5 is a top plan view of FIG. 4;

Figure 1:
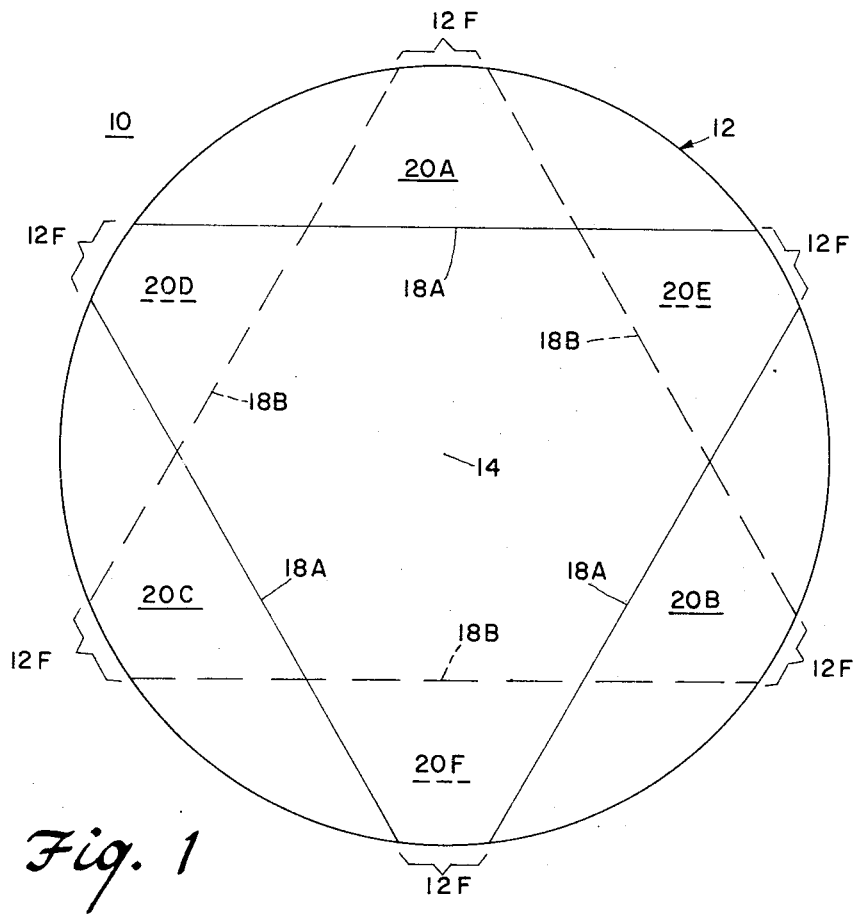
FIG. 1 is a side elevation of the basic configuration of the present invention.

Basically, the wheel configuration of the present invention can be described as the configuration achieved by rotating a cube on a diagonal axis thereof. Preferred embodiment to achieve pure rolling motion of the wheel on hard flat surfaces are primarily achieved by removing, on a line of cut parallel to the diagonally disposed rolling axis (axis of rotation), all of the material of the cube extending beyond a radius having its outer limits defined between the apex (innermost reference point) of the V-shaped peripheral projection of the surface of rotation and the low point (outermost reference point) of the curvilinear projection of the surface of rotation. These projections appear in those planes which contain and pass through the rolling axis of the wheel configuration.

The resulting configuration will have a periphery constituting a rolling surface symmetrical with the axis of revolution, circular when viewed in an axial direction, with that same periphery being serpentine in top plan view. The serpentine configuration is symmetrically disposed about the rolling periphery of the wheel and has regular intervals of recurrence.

The remainder of the outer surface of the wheel configuration so generated consists of a plurality of angular side surfaces which merge symmetrically and contiguously with the serpentine rolling surface of the wheel and which are symmetrically staggered on opposite sides of that rolling surface.

By removing material from the solid below the outermost reference toward the innermost reference point in the surface of revolution, the resulting serpentine periphery can be selectively modified as to its width and an attendant modification of the area and configuration of the angular side surfaces will also be achieved to vary the specific traction characteristics of the wheel under various conditions.

Furthermore, once the peripheral rolling surface has been generated, the intercept angle of the side surfaces with the rolling periphery and with each other, the size of these surfaces and the configuration thereof may all be selectively varied so long as the symmetry of the configuration is maintained.

In addition, the frequency of recurrence of the serpentine shape of the rolling periphery of the wheel configuration can be selectively varied so long as a compatible symmetry of angular side surfaces is maintained, i.e., an even number of total side surfaces. Thus any member of such surfaces can be used within the foregoing parameters of construction.

In certain preferred configurations, the width of the wheel configuration can be varied to a minimum width defined by the intercepts between the V-shaped projections on the surface of revolution and an adjacent side of the cube, thus, maintaining the serpentine rolling periphery within the bounds of the wheel.

In the numerous configurations thus achieved, the angular side surfaces include opposed wheel sides and transitional surfaces which extend therefrom to symmetrically and contiguously merge with the serpentine rolling periphery.

Where the wheel sides include apex portions (the latter also comprising transitional surfaces which in some cases comprise a line, i.e., a surface of infinitely narrow width but finite in practice), these apex portions are symmetrically staggered on opposite sides of the wheel configuration.

In other preferred embodiments of the wheel configuration, two such wheels having at least one flat side each at the point of minimum width can be juxtaposed such that their respective serpentine rolling peripheries recur out of phase, thereby generating a composite serpentine rolling periphery.

By the same token, a hybrid surface can be generated such that the serpentine paths criss-cross out of phase to effect a series of "figure eights" as a rolling periphery.

Such configurations are useful for steering or dirigible wheel functions since they tend to balance out lateral forces which may be generated on the wheel configurations as a result of the particular environmental surface characteristics to which the wheels are subjected.

The wheel configurations of the present invention are suitable for both traction and control purposes and can provide pure rolling, pure walking, pure paddling or any desired apportioned combination of these actions depending upon the environmental conditions in which the wheel is to function.

The wheel configurations of the present invention will maximize their driving efficiency depending upon the supporting surface involved. For example, on a hard smooth surface, the serpentine rolling periphery will provide a pure rolling action while on uneven terrain in soft earth, mud, swamp, water, gravel, etc., this same surface can combine with the side surfaces of the wheel to effect a compound rolling, walking and/or paddling action depending upon the surface environment and the specific alteration effected in the basic configuration of the invention.

The outer surface of the wheel configuration may be smooth or treaded and the proportions of width, internal diameter and external diameter of the effective surface may be freely varied to optimize the adaptation of the wheel configuration to specific end uses.

The present invention precludes the need for special attachments to the wheel structures of vehicles for special uses and opens a wide vista of adaptability, material selection and construction for traction wheels and the like. For example, conventional wheel mounting means and vehicle running gear may be used with the present invention; solid or hollow pneumatic construction can be used; and/or elastomeric or rigid materials can be utilized.

Figure 2:
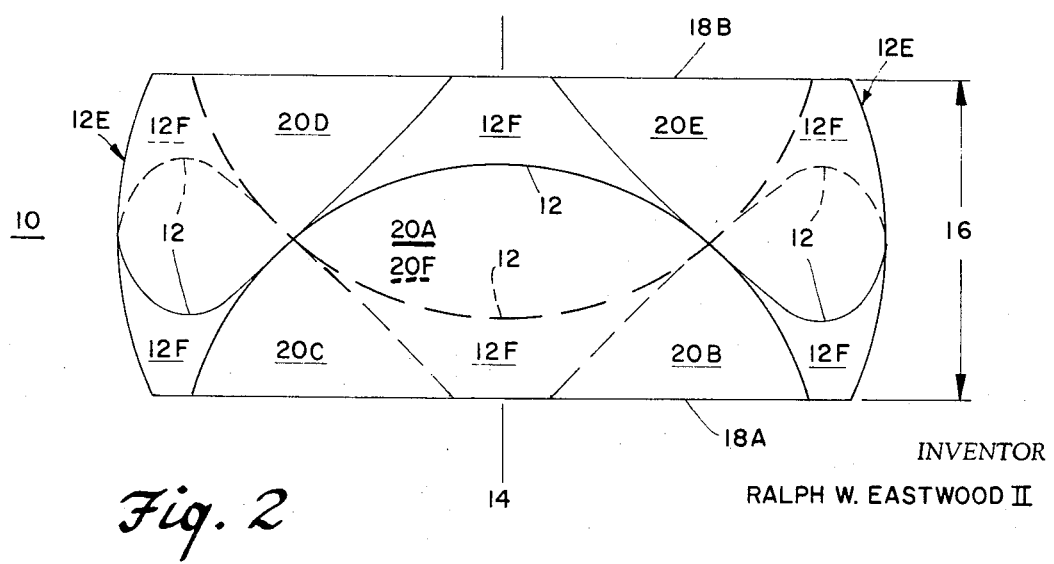
FIG. 2 is a top plan view of the configuration of FIG. 1.

Referring in detail to the drawings and specifically, to FIGS. 1 and 2, the basic traction wheel configuration 10 of the present invention is shown as including a serpentine rolling periphery 12, circular in plan view, symmetrically disposed about a rolling axis 14.

The width 16 of the wheel configuration 10 has been established to cause the said configuration to assume a generally cylindrical shape in side and top plan view, with the following sets of side faces:

Flat opposed side faces 18A and 18B parallel to one another and transversely perpendicular to the rolling axis 14;

Three angular side faces 20A, 20B and 20C symmetrically disposed on one side of the configuration 10 extending from the boundaries of the flat side surface 18A into contiguous intersection and termination at the rolling periphery 12; and Three angular side faces 20D, 20E and 20F, opposed to, geometrically similar to and symmetrically staggered with respect to the angular side faces 20A, 20B and 20C about the rolling axis 14, extending from the boundaries of the flat side surface 18B to contiguous termination with the rolling periphery 12.

The flat side surfaces 18A and 18B are shown as having straight side portions or boundaries in a generally triangular configuration with flattened apices.

Alteration of these boundaries and apices is a matter of selection which effects or is effected by a change in the boundary configurations of the angular side surfaces 20A–20F.

In the configuration 10 of FIGS. 1 and 2, the outer periphery 12E is rounded (FIG. 2) symmetrically, leaving an even number of additional curved rolling surfaces 12F symmetrically staggered about the periphery of the wheel configuration 10 on both sides thereof, within the respective boundaries of the rolling periphery 12, the angular side faces 20A–20F and the outer ends of the apices of the flat side faces 18A – 18B.

Although not shown in FIG. 2, the outer periphery 12E can be flattened to any desired point, such as that in which the rolling periphery 12 becomes a part of the rolling surface 12F or at least assumes a more finite width than the line periphery shown in FIG. 2.

The line periphery configuration of the rolling periphery 12 defines the maximum diameter for the basic wheel configuration 10.

Referring to FIGS. 3A and 3B, the basic building block R comprising a cube with a diagonal thereof comprising the rolling axis 14 is shown. The surface of revolution generated by rotating the cube R about the rolling axis 14 is shown as having an innermost reference point IRP, comprising the apex of a V-Shaped projection appearing thereon; and an outermost reference point RP, comprising the innermost point on a curvilinear projection which also appears on the surface of revolution.

It is by lines of cut PA, parallel to the rolling axis 14, that material is removed from the cube R between the limits of the reference points IRP and RP to effect the serpentine rolling periphery 12 and provide a wheel configuration having a pure rolling motion on a hard flat surface.

The width of the serpentine rolling periphery 12 is varied from a minimum width when the cut line PA is coincident with the outermost reference RP to a maximum width when the cut line PA is coincident with the innermost reference IRP.

The minimum width of the preferred wheel configuration is defined by the point MW, which comprise the intercepts between the V-shaped projection and an adjacent side of the cube R as shown in FIG. 3B.

The modification of the width of the solid R across the axis 14 such as by cutting along the dash line PC, results in various configurations of the side faces 18A and 18B of the wheel configuration 10 (FIG. 1).

Referring now to FIGS. 4 and 5, an increased diameter embodiment of the invention is shown as a wheel configuration 10A, including an increased but even number of angular faces 20AA–20LA and a pair of side faces 18AA AND 18BA having a commensurately increased number of side boundaries defined by the number of angular faces (6) present on each side of the configuration 10A.

Figure 6:
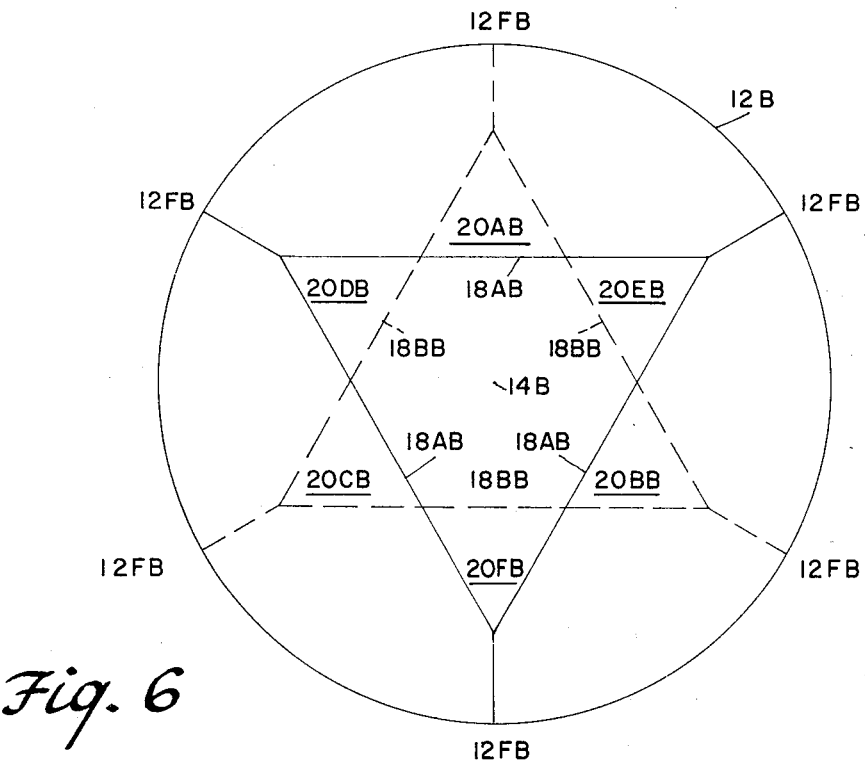
FIG. 6 is a side elevation of a third embodiment of the present invention.
Figure 7:
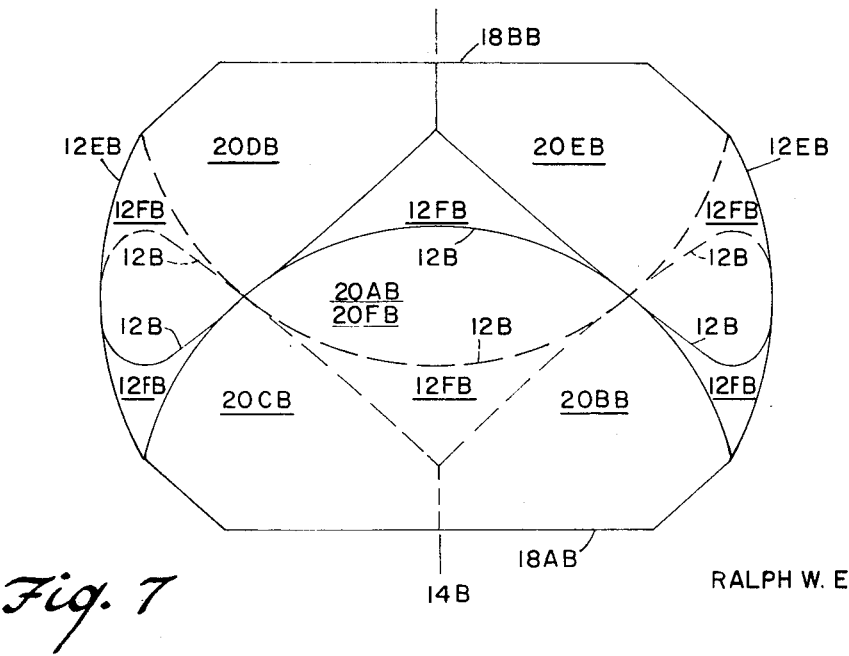
FIG. 7 is a top plan view of FIG. 6.

With reference to FIGS. 6 and 7, another embodiment of the present invention is shown as a wheel configuration 10B in which the width of the wheel is increased from the embodiment of FIGS. 1 and 2. All surfaces like those in FIGS. 1 and 2 are identified by like numerals with the additional subscript "B."

In all of the foregoing embodiments, the boundaries of the various angular, side and rolling surfaces can be modified into smooth transitional curves where desired for aesthetic as well as functional reasons. Furthermore, once the number of side and angular faces is established, various surface configurations, orientation angles and the like may be readily effectuated so long as the symmetrical staggered relationship between such surfaces and the serpentine rolling periphery is maintained.

In loose aggregate surfaces, having qualities similar to those attributed to the surface of the moon, wheel radii in excess of the outermost reference point RP will provide a pure walking action with a rolling effect due to the sinking of the wheel into the surface, the serpentine rolling periphery then extending, for the most part, into an area in the center of the wheel periphery which is of lesser radius than the maximum radius of the wheel configuration.

As can be seen from the foregoing specification and drawings, the present invention provides a new and novel hybrid traction wheel structure in which pure rolling motion is provided by the serpentine rolling periphery 12, 12A, 12B; a walking motion is provided by the apices of the side surfaces 18A – B, 18AA – BA, 18AB – BB; a paddling motion is provided by the related configuration of the angular faces 20A – 20F, 20AA – 20LA, 20AB – 20FB; and compound traction drive and gripping effects by all of the foregoing interrelated elements of the wheel configurations 10, 10A and 10B.

The environmental surface conditions to which a given wheel configuration of the present invention is subjected will determine the ultimate traction and other effects of that wheel configuration.

The symmetry of the wheel configuration of the present invention, including the symmetrically staggered relationship of opposed side and angular faces, provides for a wide range of operating speeds due to the ability of the said wheel configuration to be balanced about its rolling axis.

What is claimed is:
1. A process for making a traction wheel configuration comprising the steps of:
   a. disposing a cube on a rolling axis passing through a diagonal thereof, said cube having a surface of revolution about said axis containing a V-shaped projection and a curvilinear projection; and
   b. selectively removing a portion of said cube within the range extending from the apex of said V-shaped projection to the innermost point on said curvilinear projection in said surface of revolution, in a plane parallel to said rolling axis to provide a traction wheel configuration which will have a pure rolling motion on a hard flat surface and a paddling motion on a soft surface.
2. A process according to claim 1 further including the step of selectively removing a portion of said cube in planes substantially perpendicular to said axis in a range extending between a maximum width defined by the diagonal ends of said cube disposed on said axis and a minimum width defined by a plane passing through the intercepts between said V-shaped projection and an adjacent side of said cube disposed transversely of said V-shaped projection.
3. The process according to claim 2 further including the steps of removing a portion of a first cube from at least one of said diagonal ends up to said plane defining said minimum width;
   removing a portion of a second cube from at least one of said diagonal ends up to a like plane defining the minimum width of said second cube; and
   symmetrically juxtaposing the like planes of said first and second cubes to form a compound wheel configuration on said rolling axis.
4. A product by the process of claim 1.
5. A product by the process of claim 2.
6. A product by the process of claim 3.
7. The process according to claim 1 wherein the resulting traction wheel configuration includes a substantially serpentine periphery, opposed side surfaces, and transitional surfaces extending between said side surfaces, and said serpentine periphery;
   said process including the step of selectively varying the shape of any of said serpentine, side, and transitional surfaces to further enhance the traction capabilities of said traction wheel configuration.
8. A product by the process of claim 7.

* * * * *